United States Patent
Pan

(10) Patent No.: US 7,473,092 B2
(45) Date of Patent: Jan. 6, 2009

(54) ADJUSTING STRUCTURE FOR ADJUSTING DISTANCE BETWEEN PREFORMS

(75) Inventor: Peter Pan, Ta-Li (TW)

(73) Assignee: Chum Power Machinery Corp. (TW)

( * ) Notice: Subject to any disclaimer, the term of this patent is extended or adjusted under 35 U.S.C. 154(b) by 935 days.

(21) Appl. No.: 10/885,790

(22) Filed: Jul. 8, 2004

(65) Prior Publication Data

US 2005/0194725 A1 Sep. 8, 2005

(30) Foreign Application Priority Data

Mar. 3, 2004 (TW) .............................. 93105632 A

(51) Int. Cl.
*B29C 31/08* (2006.01)

(52) U.S. Cl. .................. 425/534; 198/803.12; 198/850; 198/867.09

(58) Field of Classification Search ................. 425/534; 198/803.12, 850, 867.09
See application file for complete search history.

(56) References Cited

U.S. PATENT DOCUMENTS

| | | | | |
|---|---|---|---|---|
| 2,548,683 | A * | 4/1951 | Remington et al. ......... | 432/122 |
| 3,268,063 | A * | 8/1966 | Soila et al. .................. | 198/850 |
| 4,501,351 | A * | 2/1985 | Tracy ..................... | 198/867.15 |
| 4,638,906 | A * | 1/1987 | Winiasz ................... | 198/803.9 |
| 5,066,222 | A * | 11/1991 | Roos et al. ...................... | 432/5 |
| 5,535,876 | A * | 7/1996 | Fortenberry et al. ... | 198/803.12 |
| 5,834,038 | A * | 11/1998 | Ogihara ...................... | 425/182 |
| 5,857,562 | A * | 1/1999 | Evrard ........................ | 198/850 |
| 6,173,832 | B1 * | 1/2001 | Cockayne ................... | 198/852 |
| 6,196,380 | B1 * | 3/2001 | Teuber et al. ............... | 198/853 |
| 6,250,459 | B1 * | 6/2001 | Coen et al. .................. | 198/852 |
| 6,981,584 | B2 * | 1/2006 | Grabmann .................. | 198/853 |
| 7,278,536 | B1 * | 10/2007 | Harrison et al. ........ | 198/867.09 |
| 2003/0006124 | A1 * | 1/2003 | Teuber ....................... | 198/850 |
| 2004/0124070 | A1 * | 7/2004 | Okoshi ...................... | 198/850 |

* cited by examiner

*Primary Examiner*—Robert B Davis
(74) *Attorney, Agent, or Firm*—Lowe Hauptman Ham & Berner, LLP

(57) ABSTRACT

A method and a structure are disclosed for adjusting the distance between two preforms. Thus, the distance between two preforms is changed by adjusting the proportion in the number of two carriers on the track. In addition, the possibility of wear of the carriers is greatly reduced. Further, it is only necessary to prepare carriers of fewer sizes so as to satisfy the distance required by diverse different containers during fabrication.

2 Claims, 5 Drawing Sheets

ADJUSTING STRUCTURE FOR ADJUSTING DISTANCE BETWEEN PREFORMS

BACKGROUND OF THE INVENTION

1. Field of the Invention

The present invention relates to a method for conveying preforms on the track of a blow molding machine, and more particularly to a method for adjusting the distance between two preforms and an adjusting structure for performing the method.

2. Description of the Related Art

A conventional blow molding machine in accordance with the prior art comprises a track, and a plurality of slide-shaped carriers each movably mounted on the track to convey a plurality of preforms successively.

The closest prior art references of which the applicant is aware are disclosed in U.S. Pat. Nos. 4,354,813 and 5,876,768. In the U.S. Pat. No. 5,876,768, a portion of the track has an arc-shaped face, thereby decreasing noise in operation and thereby saving the energy.

However, the carriers contact each other in a linear or point manner, so that the contacting portions between the carriers are easily worn during a long-term utilization, thereby increasing the distance between two adjacent preforms, such that the preforms cannot be worked exactly. In addition, it is necessary to provide multiple carriers of different sizes so as to work preforms of different sizes, thereby increasing costs of fabrication.

SUMMARY OF THE INVENTION

The primary objective of the present invention is to provide a method and a structure for adjusting the distance between two preforms, wherein the distance between two preforms is changed by adjusting the proportion in the number of two carriers on the track.

Another objective of the present invention is to provide a method and a structure for adjusting the distance between two preforms, wherein the possibility of wear of the carriers is greatly reduced.

A further objective of the present invention is to provide a method and a structure for adjusting the distance between two preforms, wherein it is only necessary to prepare carriers of fewer sizes to satisfy the distance required by diverse different containers during fabrication.

In accordance with one embodiment of the present invention, there is provided a method for adjusting a distance between two preforms, comprising:

a) preparing a track which is a closed curve having a predetermined length, a plurality of closely arranged carrier sets serially mounted on the track and each including a first carrier and at least one second carrier, the first carrier being used for mounting a preform seat which is used for mounting a preform;

b) removing a number of carrier sets from the track;

c) taking a number of second carriers having a number the same as that of the carrier sets left on the track; and d) disposing each of the second carriers on a respective one of the carrier sets, so as to increase the distance between two preform seats by changing the number of the second carriers in each of the carrier sets.

In accordance with another embodiment of the present invention, there is provided a method for adjusting a distance between two preforms, comprising:

a) preparing a track which is a closed curve having a predetermined length, a plurality of closely arranged carrier sets serially mounted on the track and each including a first carrier and at least one second carrier, the first carrier being used for mounting a preform seat which is used for mounting a preform;

b) removing a number of second carriers from each of the carrier sets;

c) taking a number of second carrier sets having the same type as that of the carrier sets left on the track; and d) disposing each of the second carrier sets on a respective one of the carrier sets, so as to decrease the distance between two preform seats by changing the number of the second carriers in each of the carrier sets.

In accordance with another embodiment of the present invention, there is provided a method for adjusting a distance between two preforms, comprising:

preparing a plurality of closely arranged carrier sets serially mounted on a track and each including a plurality of first carriers, wherein:

only one of the first carriers is provided with a preform seat, and other ones of the first carriers are not provided with the preform seat;

adjusting the distance between any two adjacent first carriers that are provided with the preform seat by changing the number of the first carriers that are not provided with the preform seat.

Further benefits and advantages of the present invention will become apparent after a careful reading of the detailed description with appropriate reference to the accompanying drawings.

DETAILED DESCRIPTION OF THE INVENTION

Figure 1:
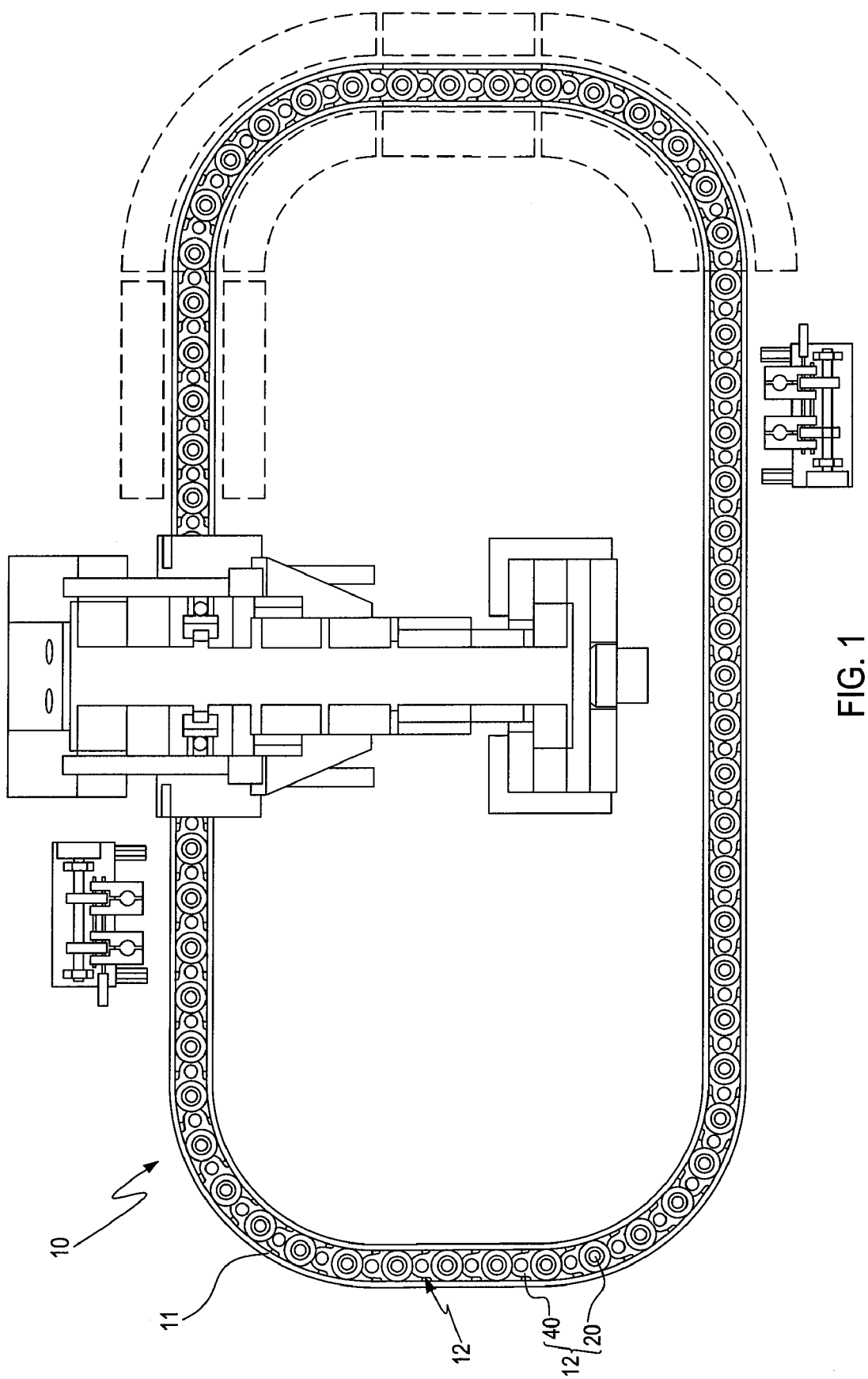
FIG. 1 is a top plan view of an adjusting structure in accordance with the preferred embodiment of the present invention.

Referring to the drawings and initially to FIGS. 1-4, an adjusting structure for adjusting the distance between two preforms in accordance with the preferred embodiment of the present invention is mounted on a blow molding machine 10 and comprises a plurality of closely arranged carrier sets 12 serially mounted on a track 11 of the blow molding machine 10.

The track 11 of the blow molding machine 10 is a closed curve having a predetermined length, and the carrier sets 12 are movable freely along the track 11 of the blow molding machine 10.

Each of the carrier sets 12 includes a first carrier 20 and a second carrier 40. The first carrier 20 has a predetermined length "P1" for mounting a preform seat 50 (see FIG. 3) which is used for mounting a preform (not shown) which is pulled and blown by the blow molding machine 10 to form a hollow container. The second carrier 40 has a predetermined length "P2" for mounting a rolling member 30 movably mounted on the track 11 of the blow molding machine 10, so that each of the carrier sets 12 can pass through the curved portions of the track 11 of the blow molding machine 10 smoothly.

Each of the carrier sets 12 has the same length and is only provided with one preform seat 50, so that the distance between any two adjacent preform seats 50 (or preforms) on the track 11 of the blow molding machine 10 is maintained at P1+P2.

Figure 5:
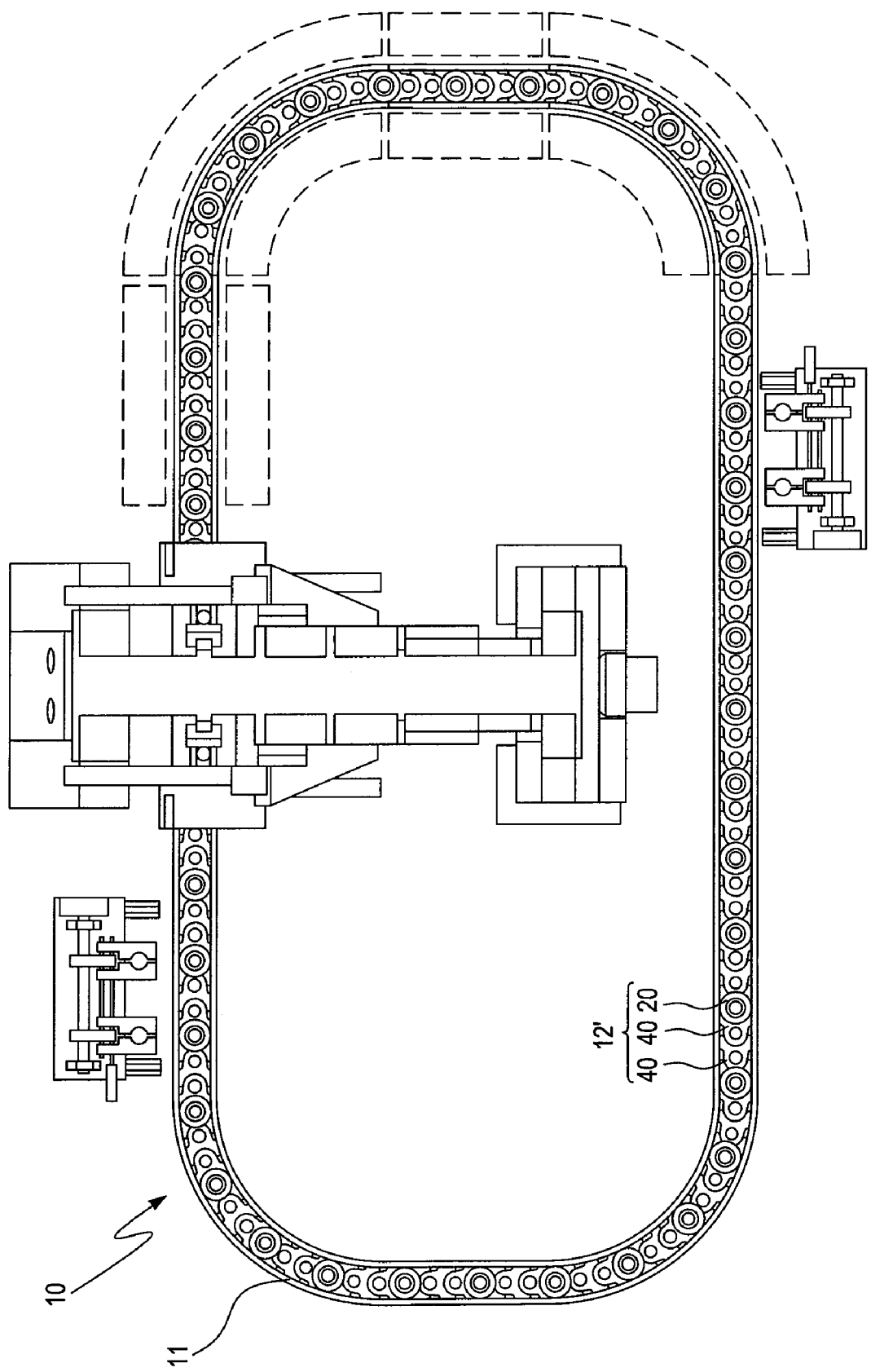
FIG. 5 is a top plan view of an adjusting structure in accordance with another embodiment of the present invention.

Referring to FIGS. 1 and 5, the method for increasing the distance between two preform seats 50 comprises the following steps:

a) removing a number of carrier sets 12 from the track 11, thereby forming a gap in the track 11 that is not filled;

b) taking a number of second carriers 40 having a number the same as that of the carrier sets 12 left on the track 11; and c) disposing each of the second carriers 40 on a respective one of the carrier sets 12, thereby forming a number of second carrier sets 12' (see FIG. 5) each containing a first carrier 20 and two second carriers 40.

Thus, the distance between any two adjacent preform seats 50 (or preforms) on the track 11 of the blow molding machine 10 is increased to and maintained at P1+P2+P2.

Alternatively, the number of the second carrier 40 in each of the carrier sets 12 is added to increase the distance between any two adjacent preform seats 50 (or preforms) on the track 11 of the blow molding machine 10 in the above-mentioned adjusting manner.

On the contrary, the method for decreasing the distance between two preform seats 50 comprises the following steps:

a) removing a second carrier 40 from each of the second carrier sets 12', thereby forming a number of original carrier sets 12 each containing a first carrier 20 and a second carrier 40, and thereby forming a gap in the track 11 that is not filled;

b) taking a number of carrier sets 12; and c) filling the number of carrier sets 12 into the track 11 to fill the gap in the track 11.

Thus, the distance between any two adjacent preform seats 50 (or preforms) on the track 11 of the blow molding machine 10 is decreased to and maintained at P1+P2.

Similarly, the second carrier 40 of each of the carrier sets 12 is removed from the track 11, so that each of the carrier sets 12 only contains a first carrier 20, thereby reducing the distance between any two adjacent preform seats 50 (or preforms) on the track 11 of the blow molding machine 10 to the minimum.

Figure 2:
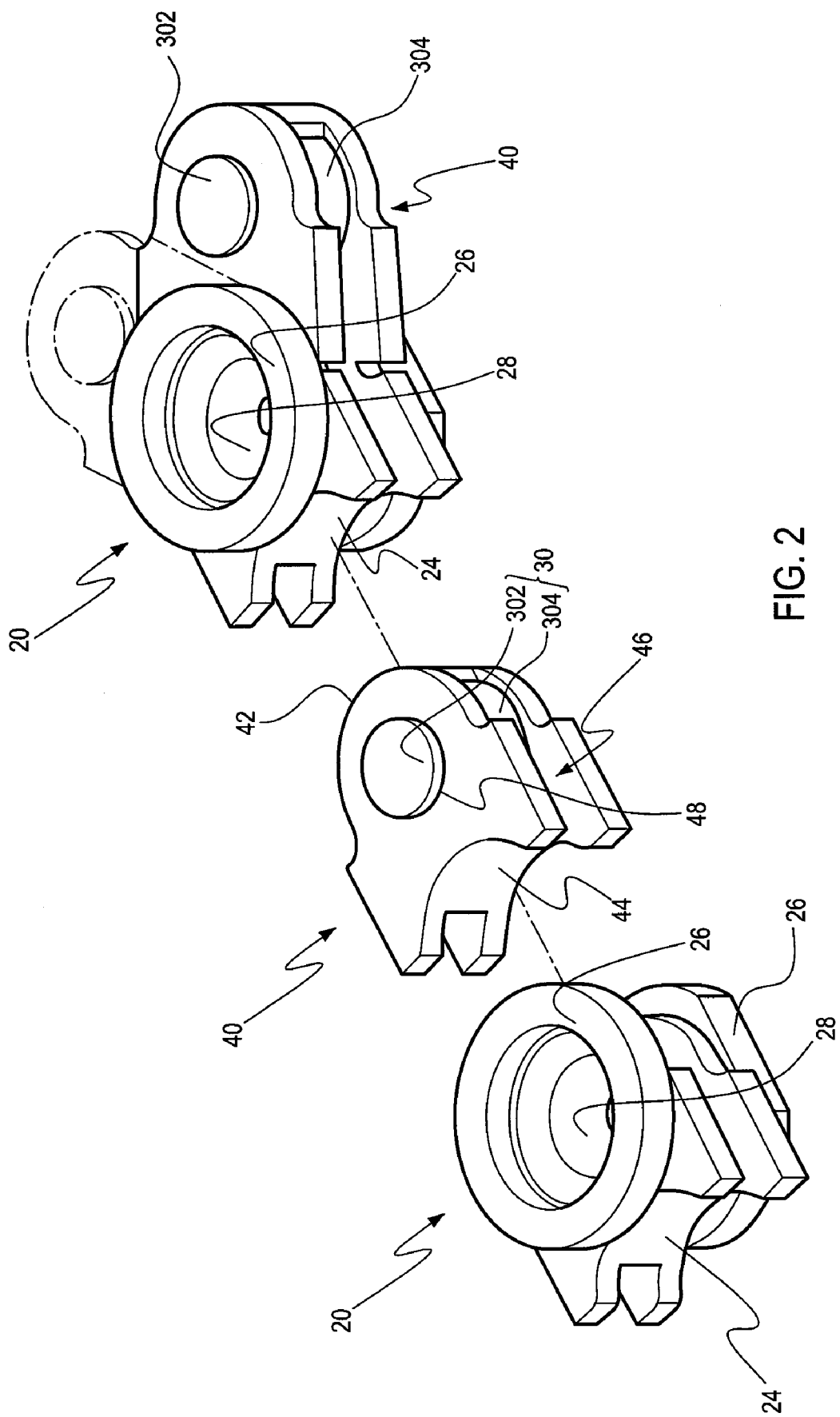
FIG. 2 is a partially exploded perspective view of a carrier set of the adjusting structure as shown in FIG. 1.
Figure 3:
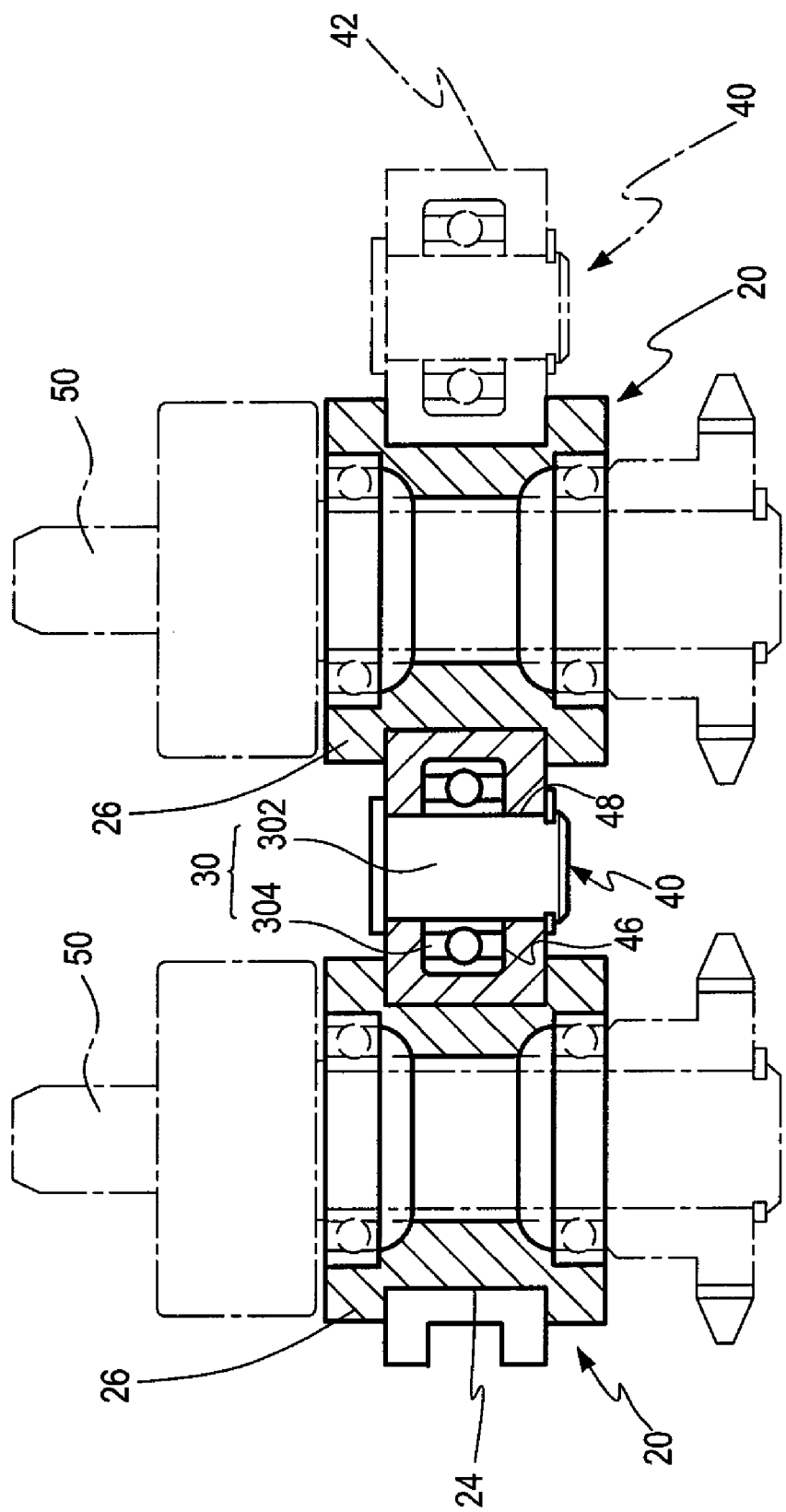
FIG. 3 is a side plan cross-sectional assembly view of the carrier set as shown in FIG. 2.
Figure 4:
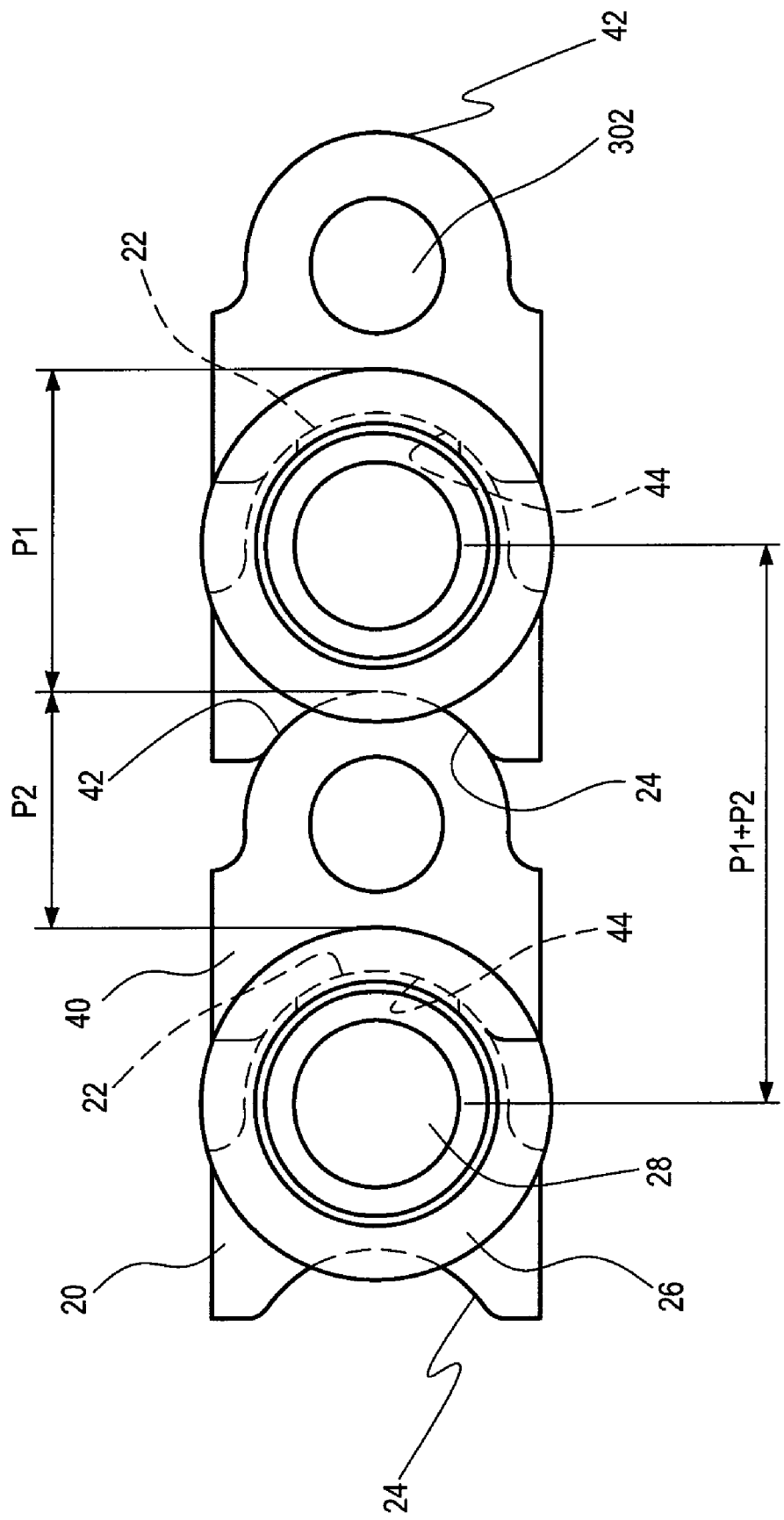
FIG. 4 is a top plan assembly view of the carrier set as shown in FIG. 2.

As shown in FIGS. 2-4, the first carrier 20 of each of the carrier sets 12 is a slide having a predetermined length and width. The first carrier 20 of each of the carrier sets 12 has a first end formed with a first contact zone 22 which is an arc-shaped convex face having a predetermined length and height, and a second end formed with a second contact zone 24 which is an arc-shaped concave face having a predetermined length and height. The first carrier 20 of each of the carrier sets 12 has two opposite end faces formed with two opposite flanges 26 each protruding outward from the first contact zone 22 and the second contact zone 24 to engage the second carrier 40. The first carrier 20 of each of the carrier sets 12 has an inside formed with a first shaft hole 28 extended through each of the two opposite flanges 26 for mounting the preform seat 50 (see FIG. 3).

The second carrier 40 of each of the carrier sets 12 is a slide having a predetermined length and width. The second carrier 40 of each of the carrier sets 12 has a first end formed with a third contact zone 42 which is an arc-shaped convex face having a predetermined length and height, and a second end formed with a fourth contact zone 44 which is an arc-shaped concave face having a predetermined length and height. A through hole 46 is formed in the second carrier 40 of each of the carrier sets 12 and is transversely extended through two sides of the second carrier 40. The second carrier 40 of each of the carrier sets 12 has an inside formed with a second shaft hole 48 extended through two opposite end faces of the second carrier 40 and communicating with the through hole 46. A rolling member 30 is pivotally mounted in the through hole 46 of the second carrier 40 of each of the carrier sets 12. In the preferred embodiment of the present invention, the rolling member 30 includes a shaft 302 mounted in the second shaft hole 48 of the second carrier 40, and a bearing 304 mounted in the through hole 46 of the second carrier 40 and mounted on the shaft 302.

The first contact zone 22, the second contact zone 24, the third contact zone 42 and the fourth contact zone 44 have the same height and radius. The distance "P1" between the first contact zone 22 and the second contact zone 24 is equal to the distance "P2" between the third contact zone 42 and the fourth contact zone 44.

When in use, the first carrier 20 and the second carrier 40 are arranged in pairs along the track 11 of the blow molding machine 10. The first contact zone 22 of the first carrier 20 is rested on the fourth contact zone 44 of the second carrier 40, and the second contact zone 24 of the first carrier 20 is rested on the third contact zone 42 of another second carrier 40, so that no gap is defined between the first carrier 20 and the adjacent second carrier 40, and the distance between any two adjacent preform seats 50 (or preforms) on the track 11 of the blow molding machine 10 is maintained at P1+P2.

The first contact zone 22 of the first carrier 20 and the fourth contact zone 44 of the second carrier 40 have a larger arc-shaped contact face, and the second contact zone 24 of the first carrier 20 and the third contact zone 42 of the second carrier 40 also have a larger arc-shaped contact face, thereby decreasing possibility of wear of the first carrier 20 and the second carrier 40.

The first carrier 20 and the second carrier 40 have a larger arc-shaped contact face, so that the first carrier 20 and the second carrier 40 contact with each other rigidly and stably at the turning position of the track 11. In addition, the rolling member 30 has a periphery in contact with the inner edge at the turning position of the track 11, so that the first carrier 20 and the second carrier 40 of each of the carrier sets 12 can pass through the curved portions of the track 11 of the blow molding machine 10 smoothly and stably.

Alternatively, each of the carrier sets 12 consists of a plurality of first carriers 20. Each of the flanges 26 of each of the first carriers 20 is not protruded outward from the first contact zone 22 and the second contact zone 24. In each of the carrier sets 12, only one of the first carriers 20 is provided with the preform seat 50, and other ones of the first carriers 20 are not provided with the preform seat 50. Thus, the distance between any two adjacent preform seats 50 (or preforms) on the track 11 of the blow molding machine 10 is adjusted by changing the number of the first carriers 20 that are not provided with the preform seat 50.

In addition, the first contact zone 22, the second contact zone 24, the third contact zone 42 and the fourth contact zone 44 have the same radius, so that the steady contact between any two adjacent first carriers 20, between the first carrier 20 and the second carrier 40 and between any two adjacent second carriers 40 is not affected by provision of the second carrier 40, by the number of the second carrier 40, or by the length relationship between the first carrier 20 and the second carrier 40.

Accordingly, the distance between two preforms is changed by adjusting the proportion in the number of two carriers on the track. In addition, the possibility of wear of the carriers is greatly reduced. Further, it is only necessary to prepare carriers of fewer sizes to satisfy the distance required by diverse different containers during fabrication.

While the preferred embodiment(s) of the present invention has been shown and described, it will be apparent to those skilled in the art that various modifications may be made in the embodiment(s) without departing from the spirit of the present invention. Such modifications are all within the scope of the present invention.

What is claimed is:

1. An adjusting structure for adjusting a distance between two preforms comprising:
    a track which is a closed curve having a predetermined length, a plurality of closely arranged carrier sets serially mounted on the track and each carrier set including a first carrier and at least one second carrier, the first carrier used for mounting a preform seat for mounting a preform, wherein
    the first carrier of each of the carrier sets has a first end formed with a first contact zone and a second end formed with a second contact zone, the first contact zone has a radius equal to that of the second contact zone; and
    the second carrier of each of the carrier sets has a first end formed with a third contact zone and a second end formed with a fourth contact zone, the third contact zone has a radius equal to that of the fourth contact zone and that of the first contact zone and the second contact zone; and
    wherein the first carrier of each of the carrier sets has two opposite end faces formed with two opposite flanges each protruding outward form the first contact zone and the second contact zone.

2. An adjusting structure for adjusting a distance between two preforms comprising:
    a track which is a closed curve having a predetermined length, a plurality of closely arranged carrier sets serially mounted on the track and each carrier set including a first carrier and at least one second carrier, the first carrier used for maintaining a preform seat for mounting a preform, wherein
    the first carrier of each of the carrier sets has a first end formed with a first contact zone and a second end formed with a second contact zone, the first contact zone has a radius equal to that of the second contact zone; and
    the second carrier of each of the carrier sets has a first end formed with a third contact zone and a second end formed with a fourth contact zone, the third contact zone has a radius equal to that of the fourth contact zone and that of the first contact zone and the second contact zone; and
    wherein the second carrier is pivotally provided with a rolling member which is located between the third contact zone and the fourth contact zone and has an outer edge protruded outward two sides of the second carrier.

* * * * *